(12) United States Patent
Yu

(10) Patent No.: US 8,639,292 B2
(45) Date of Patent: Jan. 28, 2014

(54) MULTI-MODE BASE STATION AND OPERATING METHOD AND WIRELESS COMMUNICATION SYSTEM THEREOF

(75) Inventor: Ming Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 535 days.

(21) Appl. No.: 12/437,377

(22) Filed: May 7, 2009

(65) Prior Publication Data

US 2009/0225689 A1    Sep. 10, 2009

Related U.S. Application Data

(63) Continuation of application No. PCT/CN2007/071074, filed on Nov. 16, 2007.

(30) Foreign Application Priority Data

Nov. 20, 2006   (CN) .......................... 2006 1 0149171

(51) Int. Cl.
*H04M 1/00*    (2006.01)

(52) U.S. Cl.
USPC .................... 455/561; 455/452.1; 455/552.1; 370/466; 370/330; 370/328

(58) Field of Classification Search
USPC ........ 455/127.4, 450, 451, 452.1, 452.2, 509, 455/524, 525, 552.1, 560, 561; 370/466, 370/330, 401; 375/367, 216; 709/236, 226, 709/228

See application file for complete search history.

(56) References Cited

U.S. PATENT DOCUMENTS

| 5,633,868 | A | * | 5/1997 | Baldwin et al. ............... 370/331 |
| 5,729,536 | A | * | 3/1998 | Doshi et al. ................... 370/398 |
| 5,999,990 | A | * | 12/1999 | Sharrit et al. ..................... 710/8 |
| 6,018,521 | A | * | 1/2000 | Timbs et al. .................. 370/342 |
| 6,034,950 | A | * | 3/2000 | Sauer et al. ................ 370/310.2 |
| 6,188,898 | B1 | * | 2/2001 | Phillips ......................... 455/433 |

(Continued)

FOREIGN PATENT DOCUMENTS

| CN | 1509521 A | 6/2004 |
| CN | 1512793 A | 7/2004 |

(Continued)

OTHER PUBLICATIONS

English Translation of the Written Opinion, mailed Mar. 6, 2008, in corresponding International Application No. PCT/CN2007/071074 (3 pp.).

(Continued)

*Primary Examiner* — Mahendra Patel

(74) *Attorney, Agent, or Firm* — Staas & Halsey LLP

(57) ABSTRACT

A multi-mode base station and an operating method and a wireless communication system thereof are provided. The multi-mode base station includes: at least two protocol processing modules, vested in at least two modes respectively, and adapted to process data and/or signaling of the mode according to the protocol corresponding to the mode; and an interface processing module, adapted to distinguish the mode of the data and/or the signaling while receiving the data and/or the signaling, and distribute the data and/or the signaling to the protocol processing module corresponding to the mode. Thus, the reconfiguration of the multi-mode base station can be performed more conveniently and quickly.

14 Claims, 5 Drawing Sheets

(56) References Cited

U.S. PATENT DOCUMENTS

| | | | |
|---|---|---|---|
| 7,068,644 B1* | 6/2006 | McConnell et al. | 370/352 |
| 7,224,705 B2* | 5/2007 | Piirainen | 370/503 |
| 7,602,763 B2* | 10/2009 | Adolfsen et al. | 370/350 |
| 7,680,515 B2* | 3/2010 | Cho et al. | 455/561 |
| 7,784,028 B2* | 8/2010 | Luo et al. | 717/120 |
| 7,796,554 B2* | 9/2010 | Liu et al. | 370/331 |
| 2004/0240402 A1 | 12/2004 | Stephens | |
| 2006/0229079 A1* | 10/2006 | Cheng et al. | 455/450 |

FOREIGN PATENT DOCUMENTS

| | | |
|---|---|---|
| CN | 1795645 | 6/2006 |
| CN | 1863346 | 11/2006 |
| EP | 1890386 | 2/2008 |
| WO | 99/25143 | 5/1999 |
| WO | 99/60715 | 11/1999 |
| WO | 2004/060002 | 7/2004 |
| WO | 2005/099181 | 10/2005 |

OTHER PUBLICATIONS

Extended European Search Report, mailed Mar. 4, 2010, in corresponding European Application No. 07817264.0 (6 pp.).

Office Action, mailed May 24, 2010, in corresponding Chinese Application No. 200610149171.6 (14 pp.).

EPO Office Action issued Jan. 9, 2013 in corresponding European Patent Application No. 07 817 264.0-1249 (5 pages).

* cited by examiner

MULTI-MODE BASE STATION AND OPERATING METHOD AND WIRELESS COMMUNICATION SYSTEM THEREOF

CROSS-REFERENCE TO RELATED APPLICATIONS

This application is a continuation of International Application No. PCT/CN2007/071074, filed on Nov. 16, 2007, which claims the benefit of Chinese Patent Application No. 200610149171.6, filed on Nov. 20, 2006, both of which are hereby incorporated by reference in their entireties.

FIELD OF THE TECHNOLOGY

The present invention relates to a wireless communication field, and more particularly to a multi-mode base station technique.

BACKGROUND OF THE INVENTION

In recent years, the communication technique, especially the mobile communication technique, has been developing rapidly. The first generation mobile communication system to the third generation (3G) mobile communication system have been proposed in succession, so that the mobile communication has produced more and more significant effects on the people's daily life and work. Recently, the number of users of the mobile communication is continuously increasing, and various types of mobile services are released accordingly. As for this continuously expanded market, each large mobile operator in the world strives to attract and maintain the users of the mobile communication by quickly providing new mode services, thereby enhancing the competitiveness in the market.

Two solutions to realizing the new mode service exist in the prior art.

In the first solution, a new mode base station is added based on the original mode, so as to form an overlay communication network, which provides different mobile services for the users. The problem of this solution is that a large investment and operation cost is required in order to establish such an overlay network, for example, a large cost is required for purchasing equipment, acquiring a site, establishing the site, as well as network operation and maintenance.

The second solution is directed to a multi-mode base station type, in which one existing mode base station is reconfigured into a base station of another mode, or another mode is added for the base station of the existing mode, so that the base station is reconfigured into a multi-mode base station.

Briefly speaking, a multi-mode base station refers to a base station that supports more than two wireless air interface modes in one base station cabinet, for example, the wireless air interface modes of global system for mobile communication (GSM), wideband code division multiple access (WCDMA), code division multiple access 2000 (CDMA2000) are supported at the same time.

During realization, base band boards of different modes are inserted in the same base band frame of the base station, so as to form a multi-mode base station. As for the realization method, fixed slots are assigned to different modes in advance. For example, the first to fourth slots are assigned to the WCDMA mode, and the fifth to eighth slots are assigned to the GSM mode. In different modes, radio frequency circuits between the base band boards and a radio frequency unit are also different. If the modes corresponding to the slots are fixed, the radio frequency circuits between the boards and the radio frequency unit are respectively set according to the mode for each slot.

For the multi-mode base station, when a new mode is added, the old mode board may be disassembled, and the new mode board is assembled into the corresponding slot, for example, the GSM board is disassembled, and the WCDMA mode board is inserted, so that one mode base station is reconfigured into a base station of another mode. Alternatively, the new mode module is directly inserted into the corresponding slot, for example, the WCDMA board is added to the base station already having the GSM mode board, so that the base station is reconfigured into a multi-mode base station, as shown in FIG. 1.

On the whole, the advantage of the second solution compared with the first solution lies in saving the cost of the sites and cabinets. However, the new and old mode modules do not have a uniform design, so that the common problems of the two solutions are as follows.

Firstly, it is relatively inconvenient to reconfigure the mode including adding and deleting the mode. Secondly, the resource is somewhat wasted, and cannot be shared.

SUMMARY OF THE INVENTION

The present invention is directed to a multi-mode base station, an operating method, and a wireless communication system thereof, so as to implement a reconfiguration of a multi-mode base station conveniently.

An embodiment of the present invention provides a multi-mode base station, which includes at least two protocol processing modules and an interface processing module.

The at least two protocol processing modules are respectively vested in at least two modes, and are adapted to process data and/or signaling of the mode according to a protocol corresponding to the mode.

The interface processing module is adapted to distinguish the mode of the data and/or the signaling while receiving the data and/or the signaling, and distribute the data and/or the signaling to the protocol processing module corresponding to the mode.

The present invention provides a method for operating a multi-mode base station, which includes the steps as follows.

The multi-mode base station distinguishes a mode of data and/or signaling through a shared interface processing module while receiving the data and/or the signaling, and distributes the data and/or the signaling to a protocol processing module corresponding to the mode. The protocol processing module processes the data and/or the signaling according to a protocol corresponding to the mode.

An embodiment of the present invention provides a wireless communication system, which includes at least one multi-mode base station.

The multi-mode base station includes at least two protocol processing modules and an interface processing module.

The at least two protocol processing modules are respectively vested in at least two modes, and are adapted to process data and/or signaling of the mode according to a protocol corresponding to the mode.

The interface processing module is adapted to distinguish the mode of the data and/or the signaling while receiving the data and/or the signaling, and distribute the data and/or the signaling to the protocol processing module corresponding to the mode.

It can be known through comparison that the main difference between the technical solution of the embodiments of the present invention and the prior art lies in setting a corresponding protocol processing module and one shared interface processing module for each mode supported by the base station. The interface processing module receives the external data and/or signaling, distinguishes the mode of the received data and/or signaling, and transmits the data and/or the signaling to the protocol processing module corresponding to the mode. Each protocol processing module processes the received data and/or signaling according to a protocol corresponding to the mode. Thus, the multi-mode base station is enabled to form a logical entity while supporting different protocols, thereby transmitting and receiving the data and performing the management operation in a unified manner, so that the operation complexity is reduced, and the resources are conveniently shared by each mode.

The multi-mode base station sets a corresponding resource management module for each mode, and further sets one shared global resource management module for all the modes. The global resource management module is adapted to assign an available resource scope to each mode. The resource management module corresponding to each mode is adapted to assign a required resource to the protocol processing module in the available resource scope of the mode. Since the resource management module of each mode is under a macro control of the global resource management module, the global resource management module can adjust the resource scopes among different modes according to the loading situations, so that the shared resources are assigned and managed in a better way, thereby improving a resource utilization rate.

Through the architecture of the embodiments of the present invention, the reconfiguration of the multi-mode base station can be performed conveniently. If it intends to add a new mode, it is only necessary to add a corresponding protocol processing module and a resource management module, and if it intends to delete a certain mode, it is only necessary to remove the protocol processing module and the resource management module corresponding to the mode, so that the reconfiguration can be performed conveniently and quickly. In addition, the dynamic configuration may be adopted to ensure that the current service is not affected during the reconfiguration.

BRIEF DESCRIPTION OF THE DRAWINGS

The present invention will become more fully understood from the detailed description given herein below for illustration only by referring to the accompanying drawings among which.

DETAILED DESCRIPTION OF THE EMBODIMENTS

In order to make objectives, technical solutions, and advantages of the present invention more comprehensible, a detailed description of the present invention is given below by reference to accompanying drawings.

In the embodiment of the present invention, a corresponding protocol processing module and one shared interface processing module are set for each mode supported by a base station. The interface processing module receives external data and/or signaling, distinguishes the mode of the received data and/or signaling, and transmits the data and/or the signaling to the protocol processing module corresponding to the mode. Each protocol processing module processes the received data and/or signaling according to a protocol corresponding to the mode. Thus, the multi-mode base station forms a logical entity while supporting different protocols, thereby transmitting and receiving the data and performing the management operation in a unified manner, so that the operation complexity is reduced, the resources are conveniently shared by each mode, and the reconfiguration of the modes could be implemented easily.

A multi-mode base station in the present invention refers to a base station that supports at least two modes, including a GSM mode, a CDMA mode, a worldwide interoperability for microwave access (WiMAX) mode, a WCDMA mode, a time division synchronous code division multiple access (TD-SCDMA) mode, a CDMA2000 mode, a personal handy phone system (PHS) mode, a cluster mode, a long term evolution (LTE) mode, and an air interface evolution (AIE) mode.

A first embodiment of the present invention is described as follows, in which a multi-mode base station and a method for operating a base station are described. The multi-mode base station includes: at least two protocol processing modules, respectively vested in at least two modes, and adapted to process data and/or signaling of the mode according to a protocol corresponding to the mode; an interface processing module, adapted to distinguish the mode of the data and/or the signaling while receiving the data and/or the signaling, and distribute the data and/or the signaling to the protocol processing module corresponding to the mode; resource management modules, separately corresponding to each protocol processing module, and adapted to assign resources required for processing the data and/or the signaling to the corresponding protocol processing modules; and a global resource management module, adapted to assign an available resource scope to each mode, in which the resource management module corresponding to each mode assigns the resources to the protocol processing module within the available resource scope of the mode.

Figure 1:
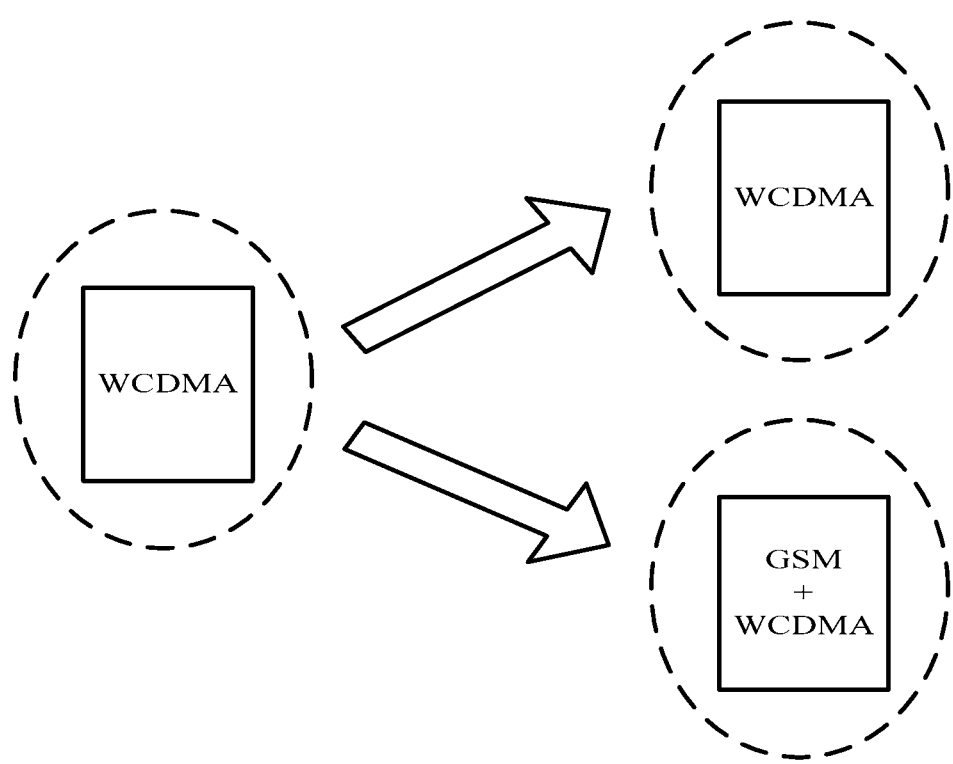
FIG. 1 is a schematic view of adding a mode in a multi-mode base station in the prior art.
Figure 2:
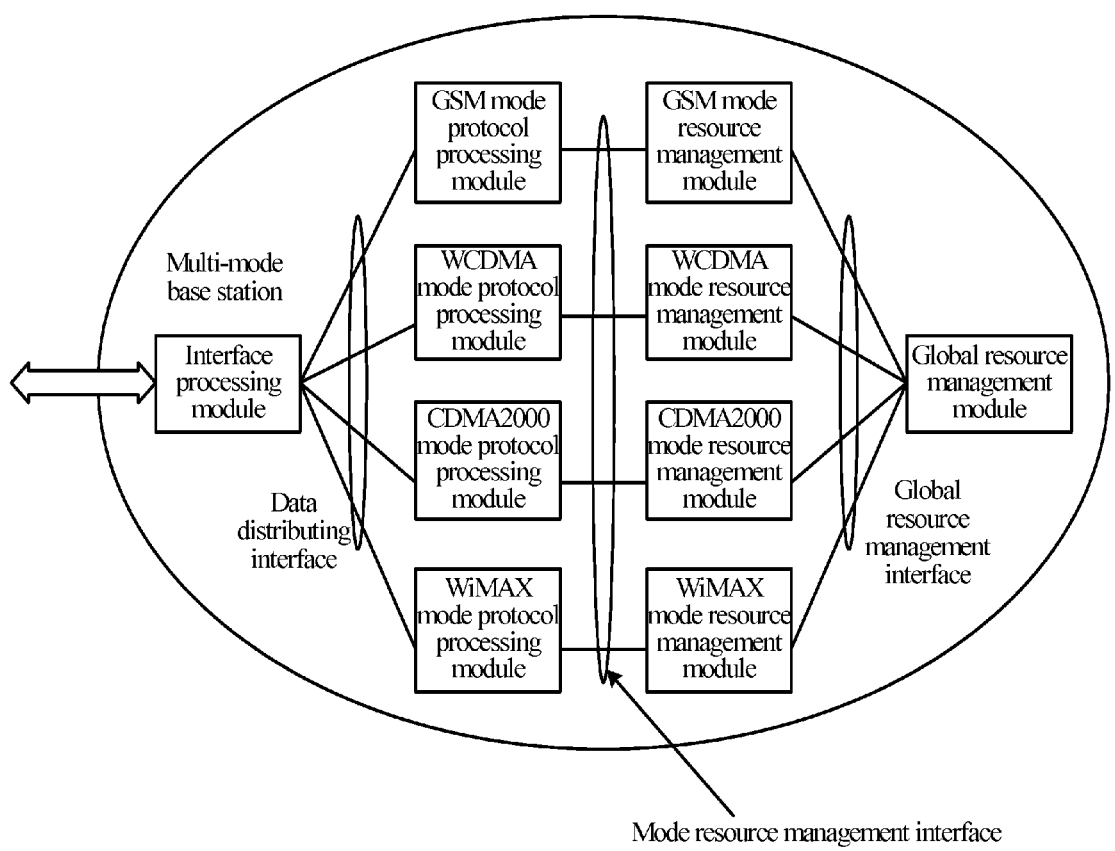
FIG. 2 is a system structural view of a multi-mode base station according to a first embodiment of the present invention.

For example, a multi-mode base station shown in FIG. 2 supports four modes, that is, the GSM, the WCDMA, the CDMA2000, and the WiMAX, so that the base station includes: protocol processing modules respectively vested in the four modes, that is, a GSM mode protocol processing module, a WCDMA mode protocol processing module, a CDMA2000 mode protocol processing module, and a WiMAX mode protocol processing module; corresponding resource management modules, that is, a GSM mode resource management module, a WCDMA mode resource management module, a CDMA2000 mode resource management module, and a WiMAX mode resource management module; and an interface processing module and a global resource management module shared by each mode. Each mode shares the interface processing module and the global resource management module, so that the base station receives the external data or signaling of each mode, and flexibly allocates the internal resources. Thus, the multi-mode base station forms a logical entity, thereby performing the management operation in a unified manner, so that the operation complexity is reduced, and the resources are conveniently shared by each mode.

During realization, the resource management module corresponding to each mode and the global resource management module may be deployed on one physical entity, or even combined into one realizing module. The resource management module corresponding to each mode and the corresponding protocol processing module may be deployed on one physical entity.

In this embodiment, as for IP data and/or signaling, the interface processing module distinguishes the mode of the data and/or the signaling according to an address and/or a port number of the data and/or the signaling. As for an asynchronous transfer mode (ATM), the interface processing module distinguishes the mode of the data and/or the signaling according to the address and/or a permanent virtual line number of the data and/or the signaling.

Figure 3:
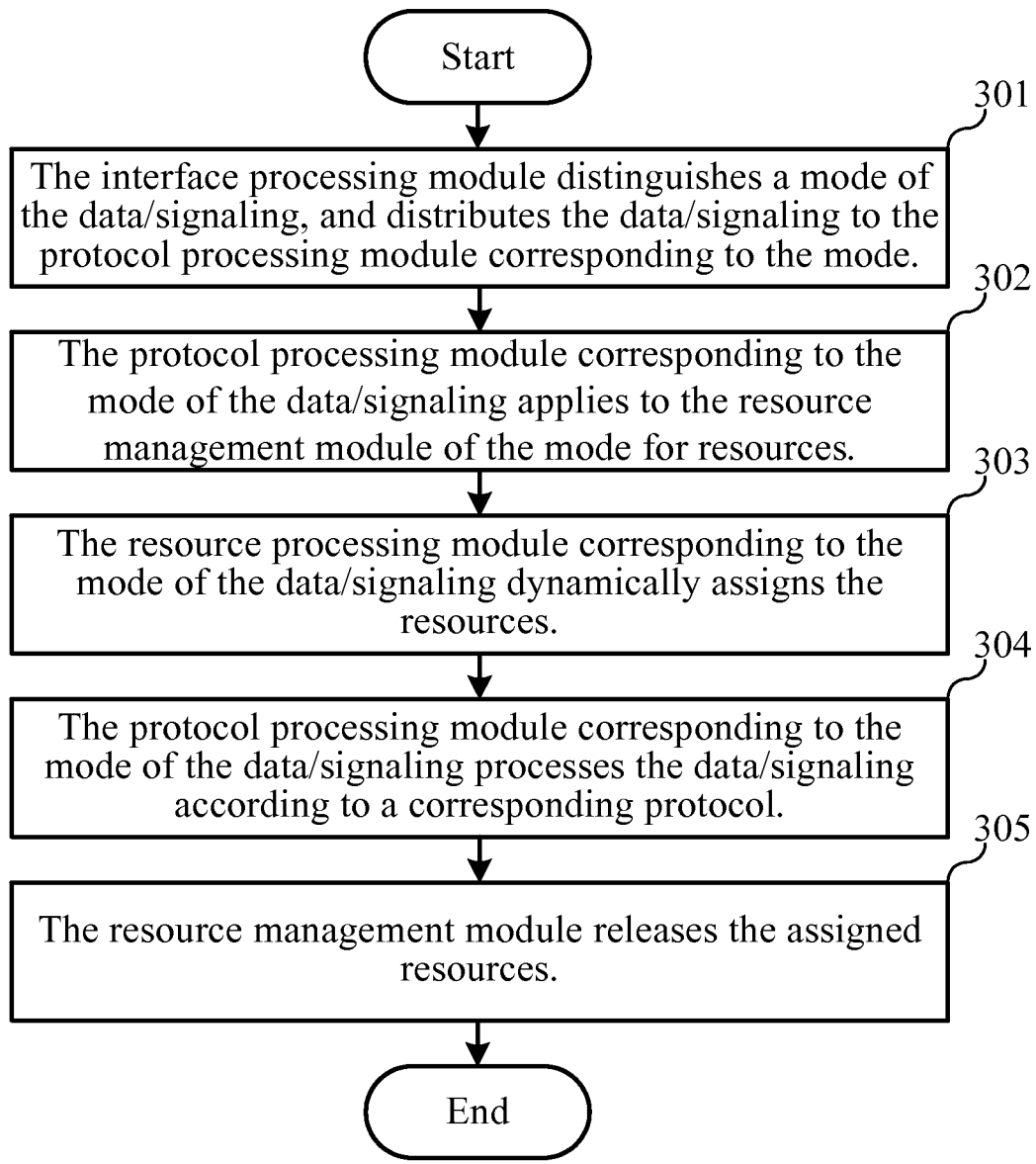
FIG. 3 is a flow chart of operating the multi-mode base station according to the first embodiment of the present invention.

The dynamic operation process among each module in the multi-mode base station is described through an operation flow of the multi-mode base station, as shown in FIG. 3.

In Step 301, the base station receives data and signaling from an external transmission link. The interface processing module distinguishes the mode of the received data or signaling, and distributes the data or the signaling to the protocol processing module corresponding to the mode for being processed. The interface processing module may distinguish the mode of the data or the signaling through different addresses+ port numbers. Taking IP data and signaling for example, the mode of the IP data and signaling may be distinguished according to an IP address and a transfer control protocol (TCP)/user datagram protocol (UDP) port number. The interface processing module needs to manage and maintain a mapping relation table about "Mode-Address-Port", as shown in Table 1. According to the table, the interface processing module can uniquely determine the mode of the received data or signaling. The table may be adjusted according to the practical requirements, in which one wireless mode can correspond to a plurality of IP addresses and a plurality of port numbers, but the same IP address or port number can only correspond to one wireless mode.

TABLE 1

| Wireless Mode Protocol | IP Address | TCP Port Number | UDP Port Number |
|---|---|---|---|
| WCDMA | 10.121.37.46 | 2000 | 2001, 2500-3500 |
| WCDMA | 10.121.37.47 | / | 3000-4000 |
| CDMA2000 | 10.121.37.46 | 2100 | 2101, 3500-4000 |
| WiMax | 10.121.37.48 | 2000 | 2001, 3000-4000 |
| ... | ... | ... | ... |

As known from Table 1 that, when the IP address of the received data or signaling is 10.121.37.46, the TCP port number is 2000, the UDP port number is 2001 or any port number between 2500 and 3500, the interface processing module determines that the data or the signaling is the data or the signaling of the WCDMA mode, and distributes the data or the signaling to the WCDMA mode protocol processing module.

Next, in Step 302, after receiving the data or the signaling, the protocol processing module corresponding to the mode applies to the resource management module of the mode for resources. As for the above example, after receiving the data or the signaling, the WCDMA mode protocol processing module applies to the WCDMA mode resource management module for resources required for processing the data or the signaling.

Next, in Step 303, the corresponding resource management module dynamically assigns resources in the available resource scope of the mode according to processing requirements. In the above example, the WCDMA mode resource management module dynamically assigns the required resources to the WCDMA mode protocol processing module in the available resource scope of the WCDMA mode.

The available resource scope of each mode is assigned by the global resource management module in advance, and then the global resource management module notifies the resource management module corresponding to each mode of an assignment result, so that the resource management module corresponding to each mode freely assigns resources in the available resource scope of the mode. Because the resource management module of each mode is under a macro control of the global resource management module, the global resource management module may adjust resource scopes among different modes according to the loading situations, so that the shared resources may be assigned and managed in a better way, thereby improving a resource utilization rate.

The assigned resource scopes include universal resources supporting each mode of the base station and resources only supporting a single mode, and the resources may be divided as follows.

According to different functions of the resources, the internal resources of the base station may be divided into transmission resources such as transmission bearings and port numbers, base band resources such as modulators, demodulators, encoders and decoders, and radio frequency resources such as transceivers and power amplifiers, and the like.

According to the resource assigning occasions, the internal resources of the base station may be divided into static resources and dynamic resources. The static resources refer to resources assigned during initialization, which are usually not released during the operation process of the base station. The dynamic resources refer to resources dynamically assigned and released according to the user services during the operation process of the base station.

According to the wireless modes supported by the resources, the internal resources of the base station may be divided into dedicated resources and universal resources. The dedicated resources refer to resources only supporting a certain specific wireless mode, and the universal resources refer to resources supporting a plurality of wireless modes.

The global resource management module assigns the available resource scope of each mode according to the characteristics of each type of resources. For example, the resources only supporting a single mode are assigned to the available resource scope of the mode, and cannot be shared by the other modes. The resource management module corresponding to each mode dynamically or statically assigns the resources in the available scope thereof according to the characteristics of each type of resources. In this step, the WCDMA mode resource management module assigns dynamic resources.

Next, in Step 304, the WCDMA mode protocol processing module uses the resources assigned by the resource management module thereof to process the received data or signaling according to a protocol corresponding to the WCDMA mode.

After the WCDMA protocol processing module finishes processing the data or the signaling, the flow proceeds to Step 305, in which the WCDMA mode resource management module releases the assigned relevant dynamic resources.

The basic modules of the multi-mode base station have been described above. In addition, the multi-mode base station further includes a reconfiguration module. When the multi-mode base station supports a new mode, the reconfiguration module is adapted to configure a protocol processing module and a resource management module corresponding to the new mode in the multi-mode base station, add information required for distinguishing the new mode in the interface processing module, and instruct the global resource management module to assign an available resource scope to the new mode. When the multi-mode base station does not support a certain existing mode any more, the reconfiguration module deletes the protocol processing module and the resource management module corresponding to the mode, deletes the information for distinguishing the mode from the interface processing module, and instructs the global resource management module to release the available resource scope assigned to the mode. When a new mode is supported or an old mode is invalidated, it is only necessary to add or delete the corresponding protocol processing module and resource management module, so that the reconfiguration becomes quite convenient.

When the multi-mode base station does not support the existing mode and releases the available resource scope assigned to the mode, the reconfiguration module reassigns the released available resource scope to the other modes currently used by the base station according to a preset policy or a user instruction, thereby further improving the utilization rate of the public resources.

Figure 4:
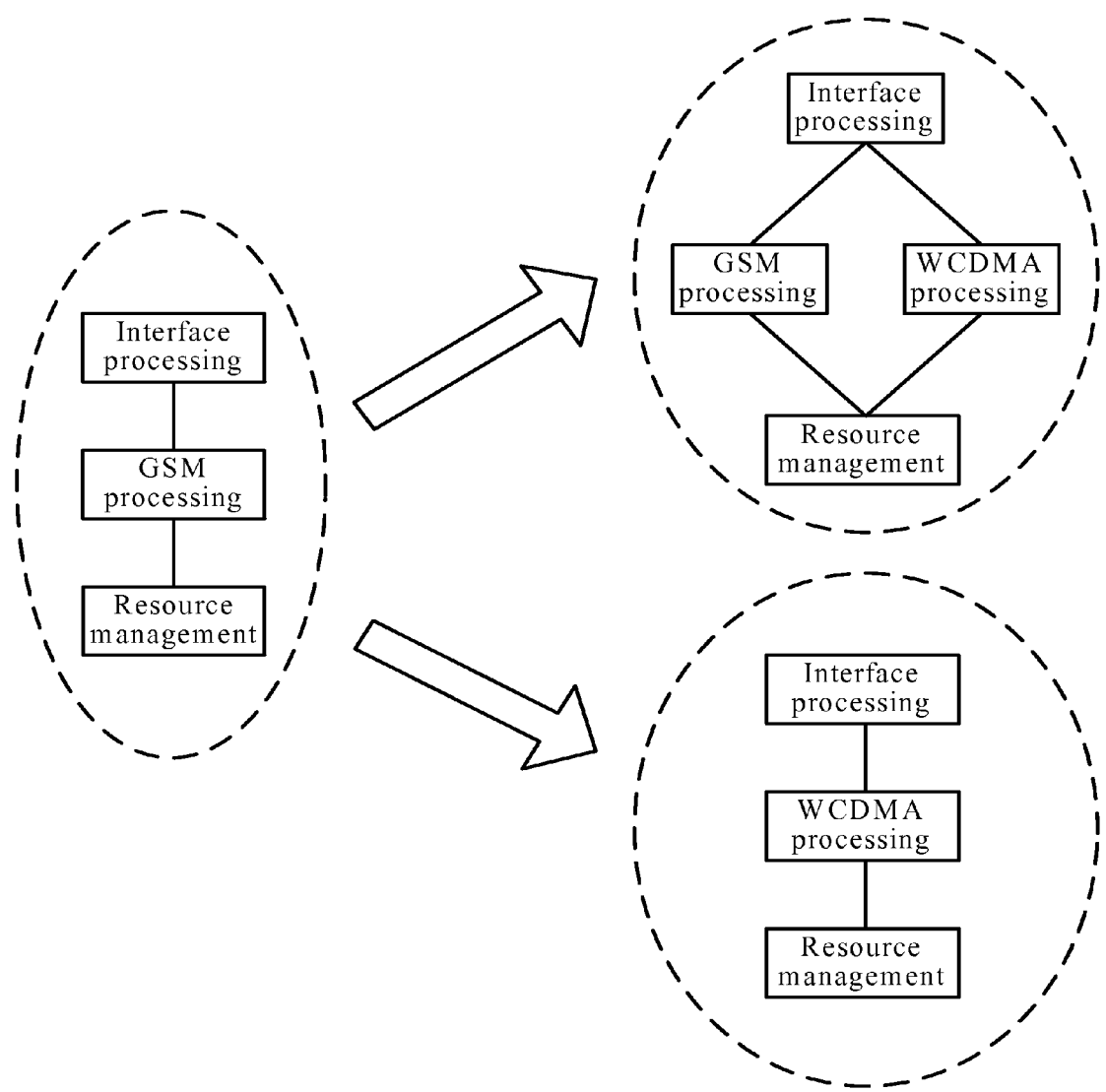
FIG. 4 is a schematic view of reconfiguring the multi-mode base station according to the first embodiment of the present invention.

Through the reconfiguration, the base station is configured from one mode to another mode, or from a state of supporting one mode to a state of supporting multiple modes, as shown in FIG. 4. The reconfiguration module configures or deletes the corresponding protocol processing module and resource management module in a static or dynamic manner. The difference there-between is that, after statically configuring or deleting the corresponding protocol processing module and resource management module, the reconfiguration module needs to reset the base station, so as to support the new mode or invalidate the old mode; whereas after dynamically configuring or deleting the corresponding protocol processing module and resource management module, the reconfiguration module does not need to reset the base station to support the new mode or invalidate the old mode. Thus, the dynamic configuration is adopted to further ensure that the current services are not affected during the reconfiguration.

There are many manners for realizing the dynamic configuration, and an example of realizing the dynamic configuration by dynamically loading/unloading upgrade software is cited below. When a new mode is supported by using the upgrade software, the services of the existing modes are not interrupted during the upgrading process. The resources of the new mode can share the resources of the existing modes, or can be supported by a newly-added hardware module.

Figure 5:
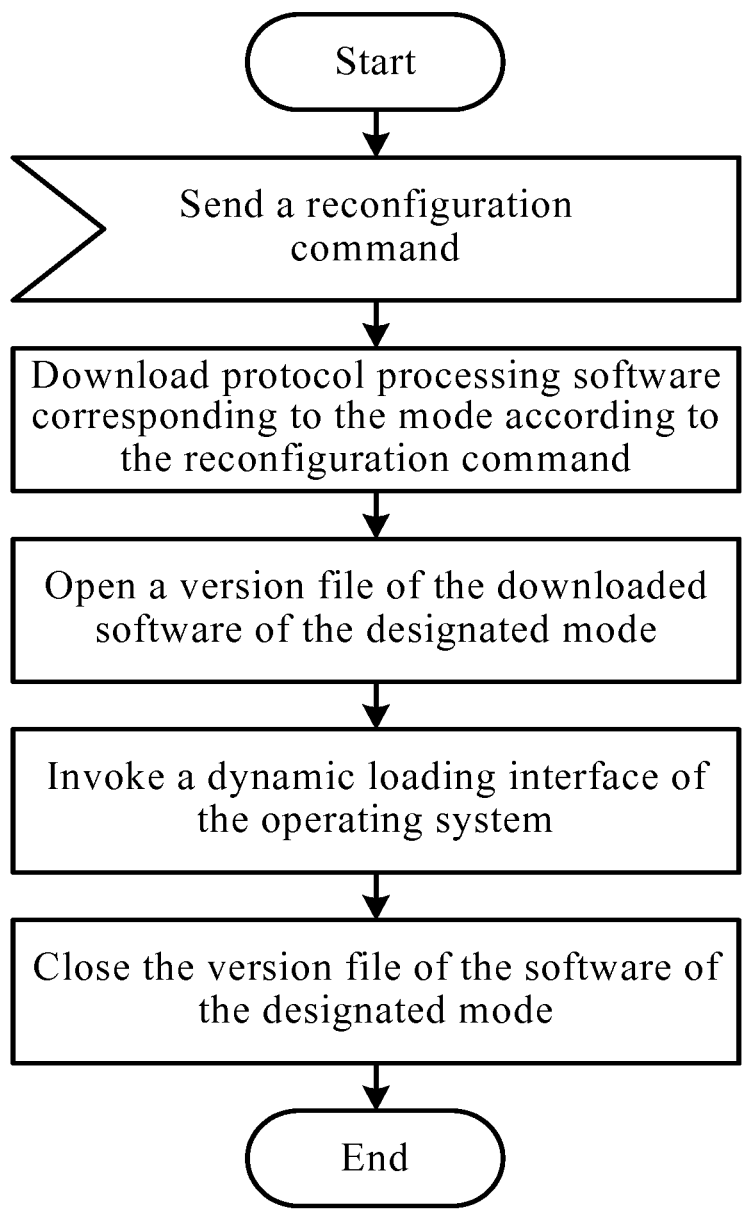
FIG. 5 is a schematic view of a dynamic loading flow of protocol processing modules in the multi-mode base station according to the first embodiment of the present invention.

In this example, software packages of different modes need to be issued respectively (each mode corresponds to one software package), and may be loaded and run independently. During realization, the base station downloads protocol processing software of a designated mode from a file server according to a reconfiguration command from the user, and dynamically loads and runs the corresponding protocol processing software through a dynamic loading interface of an operating system, so as to realize the reconfiguration, as shown in FIG. 5.

The dynamic support on the newly added modes is realized flexibly by adopting the dynamic loading and unloading techniques, so that the services of the current modes are prevented from being affected. The dynamic loading and unloading techniques need the support of the operating system.

The vxWorks is set as an example below to demonstrate pseudo-codes of operations of dynamically loading and deleting a mode.

```
...
Parse reconfiguration_command( );
Retrieve Protocol_Processing_software;
fdX = open ("/devX/objFile", O_RDONLY);
loadModule (fdX, LOAD_ALL_SYMBOLS);
close (fdX);
```

The multi-mode base station is reconfigured in the software manner, so that the operations of assembling and disassembling the physical modules are reduced. For example, when it intends to delete an existing mode, it is only necessary to unload the application software for the protocol processing module of the mode, instead of disassembling the corresponding board, so that the reconfiguration is realized conveniently and quickly, without requiring any labor work carried out by the management personnel.

In a second embodiment of the present invention, a wireless communication network is described, which includes at least one multi-mode base station described in the first embodiment. A corresponding protocol processing module, a corresponding resource management module, a shared interface processing module, and a shared global resource management module are set for each mode supported by the multi-mode base station. The interface processing module receives external data and/or signaling, distinguishes a mode of the received data and/or signaling, and transmits the data and/or the signaling to the protocol processing module corresponding to the mode. Each protocol processing module processes the received data and/or signaling according to a protocol corresponding to the mode. Thus, the multi-mode base station forms a logical entity while supporting different protocols, thereby transmitting and receiving the data and performing the management operation in a unified manner, so that the operation complexity is reduced, and the resources are conveniently shared by each mode. Since the resource management module of each mode is under the macro control of the global resource management module, the global resource management module may adjust the resource scopes among the different modes according to the loading situations, so that the shared resources may be assigned and managed in a better way, thereby improving the resource utilization rate.

Distinctly, those skilled in the art should appreciate that each module or each step of the present invention may be realized by universal computing devices, and may be integrated on a single computing device, or distributed in a network formed by a plurality of computing devices. Optionally, each module or each step of the present invention may be realized by program codes executable by the computing device, so that each module or each step may be stored in a storage device for being performed by the computing device. Alternatively, each module or each step of the present invention may be respectively fabricated into each integrated circuit module, or a plurality of modules or steps among the modules or steps of the present invention is fabricated into a single integrated circuit module for realization. In this manner, the present invention is not limited to any specific combination of hardware and software.

The above embodiments are merely intended to describe and explain the principle of the present invention. It should be understood that the implementation manners of the present invention are not limited thereto. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-mode base station, comprising:
a receiver, configured to receive data and/or signaling;
a shared interface processing module, configured to distinguish a wireless air interface mode of the data and/or the signaling, and distribute the data and/or the signaling to a protocol processing module corresponding to the wireless air interface mode distinguished for the data and/or the signaling
at least two protocol processing modules, respectively vested in at least two wireless air interface modes, and configured to process data and/or signaling of a wireless air interface mode according to a protocol corresponding to the wireless air interface mode;
resource management modules, respectively corresponding to each of the protocol processing modules, and adapted to assign resources required for processing the data and/or the signaling to the corresponding protocol processing modules; and
a global resource management module, configured to assign an available resource scope to each wireless air interface mode,
wherein the resource management modules corresponding to each wireless air interface mode for the corresponding protocol processing modules, assign resources required for processing data and/or signaling to a corresponding protocol processing module in an available resource scope of a wireless air interface mode.

2. The multi-mode base station according to claim 1, wherein if the data is IP data and/or signaling, the interface processing module distinguishes the wireless air interface mode of the data and/or the signaling according to an address and/or a port number of the IP data and/or the signaling; or
if the data is ATM data and/or signaling, the interface processing module distinguishes the wireless air interface mode of the ATM data and/or the signaling according to an address and/or a permanent virtual line number of the ATM data and/or the signaling.

3. The multi-mode base station according to claim 1, further comprising: a reconfiguration module, configured to:
configure a protocol processing module and a resource management module corresponding to a new wireless air interface mode in the multi-mode base station, add information for distinguishing the new wireless air interface mode in the interface processing module, and instruct the global resource management module to assign an available resource scope to the new wireless air interface mode, when the multi-mode base station supports the new mode; or
delete a protocol processing module and a resource management module corresponding to an existing wireless air interface mode, delete information for distinguishing the existing wireless air interface mode from the interface processing module, and instruct the global resource management module to release an available resource scope assigned to the existing wireless air interface mode, when the multi-mode base station does not support the existing wireless air interface mode any more.

4. The multi-mode base station according to claim 3, wherein when the multi-mode base station does not support the existing wireless air interface mode and releases the available resource scope assigned to the wireless air interface mode, the reconfiguration module reassigns the released available resource scope to the other wireless air interface modes currently used by the base station according to a preset policy or a user instruction.

5. The multi-mode base station according to claim 3, wherein the reconfiguration module statically configures or deletes the protocol processing module and the resource management module, and then resets the multi-mode base station when finishing statically configuring or deleting the protocol processing module and the resource management module; or
the reconfiguration module dynamically configures or deletes the protocol processing module and the resource management module.

6. A method of operating by a multi-mode base station, comprising:
receiving, by the multi-mode base station, data and/or signaling;
distinguishing, by a shared interface processing module of the multi-mode base station, a wireless air interface mode of the data and/or signaling;
distributing the data and/or the signaling to a protocol processing module of the multi-mode base station corresponding to the wireless air interface mode distinguished for the data and/or signaling; and
processing, by the protocol processing module of the multi-mode base station, the data and/or the signaling according to a protocol corresponding to the wireless air interface mode distinguished for the data and/or signaling,
assigning, by a resource management module corresponding to the protocol processing module, resources required for processing the data and/or the signaling to the corresponding protocol processing module,
assigning, by a shared global resource management module, an available resource scope to each supported wireless air interface mode,
wherein a resource management module corresponding to a wireless air interface mode for a corresponding protocol processing module, assigns resources required for processing data and/or signaling to the corresponding protocol processing module in an available resource scope of the wireless air interface mode.

7. The method according to claim 6, further comprising:
dynamically assigning resources according to processing requirements; and
when the protocol processing module of the multi-mode base station finishes processing the data and/or the signaling, the relevant resources is released.

8. The method according to claim 6, wherein if the data is IP data and/or signaling, the distinguishing comprises:
distinguishing the wireless air interface mode of the IP data and/or the signaling according to an address and/or a port number of the data and/or the signaling; or
if the data is ATM data and/or signaling, the distinguishing comprises: distinguishing the wireless air interface mode of the ATM data and/or the signaling according to an address and a permanent virtual line number of the ATM data and/or the signaling.

9. The method according to claim 6, further comprising:
when the multi-mode base station supports a new wireless air interface mode, configuring, by the multi-mode base station, modules for processing the data and/or the signaling according to a protocol and for dynamically assigning resources according to processing requirements corresponding to the new wireless air interface mode in the multi-mode base station, adding information for distinguishing the new wireless air interface mode, and instructing the global resource management module to assign an available resource scope to the new wireless air interface mode; or when the multi-mode base station does not support an existing wireless air interface mode any more, deleting, by the multi-mode base station, modules for processing the data and/or the signaling according to a protocol and for dynamically assigning resources according to processing requirements corresponding to the existing mode, deleting information for distinguishing the existing wireless air interface mode, and instructing the global resource management module to release an available resource scope assigned to the existing wireless air interface mode.

10. The method according to claim 9, further comprising:
when the multi-mode base station does not support the existing wireless air interface mode and releases the available resource scope assigned to the wireless air interface mode, reassigning the released available resource scope to the other wireless air interface modes currently used by the base station according to a preset policy or a user instruction.

11. A wireless communication system, comprising:
at least one multi-mode base station, wherein the multi-mode base station comprises:
a receiver, configured to receive data and/or signaling;
an shared interface processing module, configured to distinguish a wireless air interface mode of the data and/or the signaling, and distribute the data and/or the signaling to a protocol processing module corresponding to the wireless air interface mode distinguished for the data and/or the signaling;
at least two protocol processing modules, respectively vested in at least two wireless air interface modes, and configured to process data and/or signaling of a wireless air interface mode according to a protocol corresponding to the wireless air interface mode;
resource management modules, respectively corresponding to each of the protocol processing modules, and configured to assign resources required for processing the data and/or the signaling to the corresponding protocol processing modules; and
a global resource management module, configured to assign an available resource scope to each wireless air interface mode,
wherein the resource management modules corresponding to each wireless air interface mode for the corresponding protocol processing modules, assign resources required for processing data and/or signaling to a corresponding protocol processing module in an available resource scope of a wireless air interface mode.

12. The wireless communication system according to claim 11, wherein if the data is IP data and/or signaling, the interface processing module distinguishes the wireless air interface mode of the data and/or the signaling according to an address and/or a port number of the IP data and/or the signaling; or
if the data is ATM data and/or signaling, the interface processing module distinguishes the wireless air interface mode of the ATM data and/or the signaling according to an address and/or a permanent virtual line number of the ATM data and/or the signaling.

13. The wireless communication system according to claim 11, wherein the multi-mode base station further comprises:
a reconfiguration module, configured to:
configure a protocol processing module and a resource management module corresponding to a new wireless air interface mode in the multi-mode base station, add information for distinguishing the new wireless air interface mode in the interface processing module, and instruct the global resource management module to assign an available resource scope to the new wireless air interface mode, when the multi-mode base station supports the new wireless air interface mode; or
delete a protocol processing module and a resource management module corresponding to an existing wireless air interface mode, delete information for distinguishing the existing mode from the interface processing module, and instruct the global resource management module to release an available resource scope assigned to the existing wireless air interface mode, when the multi-mode base station does not support the existing wireless air interface mode any more.

14. The wireless communication system according to claim 13, wherein when the multi-mode base station does not support the existing wireless air interface mode and releases the available resource scope assigned to the wireless air interface mode, the reconfiguration module reassigns the released available resource scope to the other wireless air interface modes currently used by the base station according to a preset policy or a user instruction.

* * * * *